United States Patent Office 3,169,043
Patented Feb. 9, 1965

3,169,043
CHROMYL ACETATE ASSISTED POLY-
PROPYLENE DYEING
Pierre Baumgartner, Asnieres, France, assignor to Institut
Français du Petrole, des Carburants et Lubrifiants,
Rueil-Malmaison, Seine-et-Oise, France
No Drawing. Filed May 16, 1962, Ser. No. 195,333
5 Claims. (Cl. 8—4)

The present invention relates to a new and useful process for treating hydrocarbon high polymers so as to substantially increase their chemical affinity for dyeing materials, and to improve some of their physical properties in view of their use as raw materials for manufactured products.

This application is a continuation-in-part of my pending patent application S.N. 77,484, filed December 22, 1960, now abandoned.

Until now, the dyeing of hydrocarbon high polymers was not possible due to their high degree of physical and chemical inertness except by incorporating dyeing material into a polymer when the latter is in the liquid or plastic state prior to the step of fabrication.

Moreover, the only way for applying color printing to fabricated polymeric articles was to apply to the external surface thereof an adhesive dyeing material. However, the adhesiveness of such materials is generally insufficient to secure the maintenance of the color printing on the hydrocarbon polymer for a satisfactory period.

These two dyeing methods known in the art are, however, not applicable to the dyeing of fibers made of a hydrocarbon polymer.

It is, therefore, an object of my invention to provide a new and useful process for producing printing on hydrocarbon high polymers, which process is not only applicable to a polymer in a liquid or plastic state, but also to a solid polymer, for example in the form of a manufactured article. Such color printing may be achieved according to the present invention either in a one-stage or in a two-stage process.

It is another object of the present invention to provide a process for dyeing hydrocarbon high polymers, which may be carried out under normal conditions of temperature, corresponding to the solid state of the polymer.

It is still another object of the present invention to carry out dyeing of hydrocarbon high polymeric materials in such a manner that their tint remains stable even in the presence of agents known to have a harmful effect on dyed materials, such as light, heat and certain chemical products.

These and other objects and advantages of the present invention, as will appear from the detailed following description, are achieved by the process of the present invention comprising contacting the hydrocarbon high polymers to be treated with a chromyl derivative of any one of the aliphatic acids under operating conditions as hereinafter defined, and then with a conventional dyestuff.

The hydrocarbon polymers to be treated according to my invention are preferably selected from the group of thermoplastic polymers comprising in particular the polymerization products of alpha-olefinic monomeric materials, such as for example polyethylene, polypropylene, polyisobutylene, polystyrene, polyvinyl chloride and acetate, polvinylidene chloride, polyacrylonitrile, polymethacrylonitrile and the like, as well as the corresponding copolymers.

The term "hydrocarbon high polymers" as used in this specification refers more particularly to normally solid polymers having a relatively high molecular weight, in most cases higher than 1,000 and often higher than 5,000.

The treatment according to the present invention is based on the discovery of an affinity between hydrocarbon high polymers and chromyl derivatives of an aliphatic acid as illustrated hereinafter with particular reference to chromyl acetate, the nature of said affinity, physical or chemical, being, however, not yet ascertained.

By "chromyl acetate" it is meant, according to this invention, an acetylated derivative of chromic anhydride to which, by analogy with chromyl chloride, might be attributed the formula:

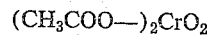

$$(CH_3COO-)_2CrO_2$$

Such a product may be obtained, for instance, by reaction of acetic anhydride with chromic anhydride.

This affinity results in a sensitiveness of the high polymer to the action of dyestuffs, in a reduction of its tendency to be charged with static electricity and in a certain coloration of the hydrocarbon high polymer when contacted for a sufficient time with a chromyl derivative of an aliphatic acid.

The intensity of said direct coloration due to the mere action of the chromyl derivative of an aliphatic acid depends upon the duration of the contact of the polymer with said chromyl derivative of an aliphatic acid, the content in the derivative of an aliphatic acid of the contacting agent, the kind of polymer treated and of the solvents which may be eventually employed, the operating temperature and other analogous factors. Said direct coloration is usually orange, greenish, brown or black, and naturally tends to evolve from the orange to the green or the black.

The effect of the treatment according to the present invention on the properties of the hydrocarbon high polymers is more or less intense according to its duration. However, an affinity of the polymers for dyestuffs is observed even after contact durations as short as one tenth of a second, which short durations are, however, insufficient to result in any significant coloration of the polymer due to the mere action of the chromyl derivative of an aliphatic acid. The affinity for dyeing materials as well as the intensity of the coloration resulting from the action of the derivative of an aliphatic acid are both increased with increasing duration of the contact while the tendency of the polymers to be charged with static electricity is decreased.

In most cases, and particularly when the treatment according to the present invention is carried out at the ambient temperature, a contact duration in the range of from one minute to one hour leads to very satisfactory results. It is, however, not profitable to unduly extend the duration of the treatment, for instance over more than 24 hours, since this would result in a reduction of the output rate which is not compensated by any noticeable further improvement of the polymer properties.

An essential and advantageous feature of the process of the present invention resides in that it may be carried out under normal temperature conditions, although, however, higher and lower temperatures are also permissible. As a general rule it is preferred to use the shortest durations of treatment with the highest temperatures and vice versa. However, when treating manufactured products made of polymeric material, too high temperatures, which may possibly result in a softening of said polymeric material, should be avoided.

In all instances, however, even when the treatment according to this invention is applied to polymers in a liquid or viscous state during the process of manufacturing articles such as fibers, films, rods, tubes, molded things, at a relatively high temperature, the temperature must be kept lower than that at which a noticeable deterioration of the polymer occurs.

The chromyl derivatives of an aliphatic acid may be advantageously used in the form of a solution in a solvent, provided that the latter is substantially chemically inert in the presence of both the chromyl derivative of an aliphatic acid and the treated high polymer.

I prefer, for carrying out my invention, to form the chromyl derivative of an aliphatic acid in situ, i.e., in actual contact with the treated polymeric material, as the product liberated during a concomitant reaction known for producing said chromyl derivative of an aliphatic acid, eventually in the presence of a solvent for one of the reactants. This may be achieved, for instance, when using chromyl acetate, by using a mixture of a chromic anhydride with acetic anhydride, or a mixture of a chromate or bichromate of an alkali or alkaline earth metal with acetic anhydride, eventually in the presence of acetic acid.

Among the various substantially chemically inert solvents for chromyl acetate which may be used for carrying out the process of the present invention, the halogenated solvents, such as methylene chloride, chloroform, carbon tetrachloride, tetrachloroethane, dibromoethane or benzene chloro-derivatives and carbon disulfide are particularly suitable. Inorganic solvents such as tin tetrachloride and silicones, particularly in the paste-form, are also suitable for carrying out the process of the present invention.

The so treated polymer may advantageously be freed from the last traces of any chromyl derivatives of an aliphatic acid by washing it with water or with an organic or a mineral solvent. It thus generally exhibits a more or less intense color which tends to become intensified during the few hours following the treatment. Such evolution of the color may be accentuated at will by subjecting the polymer to moderate heating or submitting the same to exposure to light.

The thus obtained final coloration remains practically stable and has proved to be resistant to attacking agents, provided that the latter do not dissolve or decompose the polymer.

If the entire surface of the polymer is submitted to the action of the chromyl derivative of an aliphatic acid, a substantially uniform coloration of the surface is obtained. However, where it is desired to provide the polymer with color printings on its surface, only those parts of its surface on which said color printings are to be effected may be submitted to the action of the chromyl derivative of an aliphatic acid.

As set forth above, the colorations of the hydrocarbon high polymer resulting directly from the mere action of the chromyl derivative of an aliphatic acid is limited to a small number of tints, i.e., orange, green and black, the two first of which, furthermore, do not possess a sufficient stability during the few hours immediately following the treatment and evolve under the action of light or heat as mentioned above.

It is thus more suitable, if it is desired to dye hydrocarbon high polymers, to take advantage of the fact that by the treatment of said polymers with a chromyl derivative of an aliphatic acid, a high degree of affinity for dyestuffs is imparted to said polymers.

This affinity is an entirely unexpected phenomenon in view of the prior art since, as already set forth, up to now the dyeing of high polymers and more particularly of polyolefins and particularly polyvinylchloride could not be achieved by simple methods, since in most cases, and especially when a sufficient stability of the coloration was desired, it was necessary to color the whole mass of the polymers prior to making manufactured articles, for instance by use of pigments. Such a method suffers from the drawbacks of limiting the dyeing possibilities to a small number of tints and of rendering impossible and further change of color of a manufactured article which is made of a previously dyed polymer.

In contrast thereto, according to the present invention, hydrocarbon high polymers, after treatment with a chromyl derivative of an aliphatic acid, may be directly submitted to the action of dyestuffs under the simple and conventional conditions of applicability of the latter, for instance by immersion of the treated articles made of polymer into a bath of a conventional dyestuff or by writing on the surface of such articles with printing inks. Among conventional dyestuffs, preference will be given to mordant dyes which give exceptionally good results, particularly with respect to light stability.

The delay between the treatment with the chromyl derivative of an aliphatic acid and the dyeing operation is not critical. The dyeing step may be carried out just after the treatment with the chromyl derivative of an aliphatic acid as well as several months thereafter. However, when practising the present invention in an industrial plant, it would be more expedient and economical to carry out the dyeing step after the treatment with the chromyl derivative of an aliphatic acid.

The process according to the present invention is of more particular interest for dyeing fibers and fabrics made of hydrocarbon polymers but is also applicable to the mass of the polymeric material as well as to the manufactured articles made therefrom.

In the following examples, particular attention will be directed to the case of the use of chromyl acetate which constitutes the preferred chromyl derivative of an aliphatic acid for practising the invention due to its low cost and its relatively high stability as well as to its simplicity of use and the high reproducibility of the results obtained therewith.

However, the scope of the present invention is by no way limited to the use of said particular chromyl derivative of an aliphatic acid and there may be employed other chromyl derivatives of an aliphatic acid as well, which are derivatives of acids of the general formula R—COOH wherein R represents an alkyl or halogenoalkyl radical containing from 1 to 11 carbon atoms in the molecule, such as, for instance, a methyl, ethyl, propyl, chloromethyl or trichloromethyl radical.

However, these other chromyl derivatives of an aliphatic acid are less stable than chromyl acetate, are more difficult to use and do not provide the same excellent results as when using chromyl acetate. For these reasons the latter is preferred over any other chromyl derivative of an aliphatic acid for practising the present invention.

Another process providing substantially similar advantages as those of the present invention has been described in my co-pending application Serial Number 28,230, filed May 11, 1960. According to the process described therein the hydrocarbon high polymers are contacted with a chromyl halide. However, the present process, as compared with the latter, offers the advantage resulting from the use of a less volatile chromyl derivative which is consequently more simple in application and less dangerous, the risks of inhaling relatively toxic vapors being accordingly reduced.

The following examples are illustrative of the process of my invention but are not to be considered as limiting in any way the scope of the invention.

*Example I*

Chromyl acetate is prepared in situ in a reaction vessel by admixing at the ambient temperature 100 grams of acetic anhydride and 20 grams of chromic anhydride. The resulting mixture is filtrated over fritted glass and a skein of white polypropylene is immersed thereinto for 5 minutes. The skein is then dried by submitting the same for 5 minutes to an air stream. Thereafter it is immersed for 2 hours into an aqueous solution of Rhodamine B Color Index Basic Violet 10 (C.I. 45170) at a concentration of 5 percent. The skein is then submitted to several washings with hot water and soap so as to remove the unfixed dyestuff. It is then dried in a stream of air. It has a fair rose-violaceous color.

*Example II*

Example I is repeated except that the bath wherein the polypropylene skein is immersed is maintained at a temperature of 50° C. and that immersion lasts but 30 seconds. The same fair rose-violaceous color is obtained.

*Example III*

Example I is repeated except that the skein of polypropylene is replaced by a polyethylene fabric. The same coloration as in Example I is obtained.

*Example IV*

Example I is repeated except that the skein of polypropylene is replaced by a skein of polyacrylonitrile. The same coloration is obtained as in Example I.

*Example V*

Example I is repeated except that the skein of polypropylene is replaced by a fabric made of polyvinylchloride. The same coloration as in Example I is obtained.

*Example VI*

2 g. of a polypropylene fabric is immersed for 30 seconds into a solution, maintained at a temperature of 20° C., of 1 g. chromic anhydride in 10 g. acetic anhydride. Thereafter the fabric is washed with acetic anhydride and then with water.

The fabric is then immersed into a dyeing bath, maintained at a temperature of about 50° C., consisting of 100 g. water admixed with 0.06 g. 1,2-dihydroxy-3-nitroanthraquinone (Alizarine Orange) known as a mordant dye.

The bath is then heated up to 80° C. and that temperature is maintained for 90 minutes. The fabric is then submitted to several washings with hot water and soap. It has an intense brown-red color of an exceptional stability towards sunlight.

The same results were obtained with skeins or tissues made of:

(a) Hexamethylenediamine polyadipate
(b) Polyvinyl formal
(c) Polyamide of 11-aminoundecanoic acid polymerized by itself
(d) Ethyleneglycol polyterephthalate Other conventional dyestuffs may as well be used in lieu of the above-mentioned dyestuffs. For illustrating purposes the following are mentioned:

Artisil Direct Red 3 BP (C.I. Disperse Red 15: C.I. 60710)
Artisil Direct Blue SAP (C.I. Disperse Blue 1: C.I. 64500)
Alizarine Sky Blue BS-CF (C.I. Acid Blue 78; C.I. 62105)
Alizarine Red S (C.I. Mordant Red 3: C.I. 58005)
Eriochrome Azurol B (C.I. Mordant Blue 1: C.I. 43830)
1,2,3-trihydroxyanthraquinone (C.I. Mordant Brown 42: C.I. 58200)
The dyestuff resulting from reacting salicylic acid with metanitraniline diazonium chloride (C.I. Mordant Yellow 1: C.I. 14025)

It must be emphasized that the above specific dyestuffs have been mentioned for illustrative purpose only since any other conventional dyestuff may as well be used for practising my invention, the main object of the latter being to increase the affinity of high polymers for any dyeing material and not to obtain a particular coloration.

Accordingly, it will be understood that, while there have been given herein certain specific embodiments examplifying the practice of this invention, it is not intended thereby to have this invention limited to or circumscribed by the specific details or materials, proportions or conditions herein specified, in view of the fact that my invention may be modified according to individual preference or conditions without necessarily departing from the spirit of this disclosure and the scope of the appended claims.

What I claim is:

1. A process for dyeing normally solid polypropylene, comprising the successive steps of (a) contacting said polypropylene with chromyl acetate and (b) contacting the resulting polypropylene with a dyestuff, said steps being carried out at a temperature lower than the decomposition temperature of said polypropylene.

2. The process according to claim 1, wherein the chromyl acetate is formed in situ.

3. The process according to claim 1, wherein the chromyl acetate is dissolved in a substantially chemically inert solvent therefor.

4. The process according to claim 1, wherein the dyestuff is a mordant dyestuff.

5. A process for dyeing a shaped article made of normally solid polypropylene, comprising the successive steps of (a) contacting said shaped article with chromyl acetate and (b) contacting the resulting shaped article with a dyestuff, said steps being carried out at a temperature lower than the decomposition temperature of said polypropylene.

References Cited in the file of this patent
UNITED STATES PATENTS

| | | |
|---|---|---|
| 1,871,470 | Rivat | Aug. 16, 1932 |
| 2,224,927 | Race | Dec. 17, 1940 |
| 2,886,471 | Bruce | May 12, 1959 |
| 2,984,634 | Caldwell | May 16, 1961 |
| 2,984,653 | Witt | May 16, 1961 |
| 3,023,072 | Dabrowski | Feb. 27, 1962 |

OTHER REFERENCES

Wilson: The Chemistry of Leather Manufacture, 2nd Ed., vol. II, pp. 601–631, 1929, pub. by the Chemical Catalog Co. Inc., New York City.

Moncrief: Wool Shrinkage, pages 307–310 and pages 478–480 and 556; pub. 1953 by the National Trade Press Inc., London, England.